Jan. 28, 1964 W. J. GAULD 3,119,694
DISPOSABLE COFFEE PERCOLATOR UNIT
Filed Aug. 13, 1962

INVENTOR.
WILLIAM J. GAULD
BY
Knox & Knox

United States Patent Office 3,119,694
Patented Jan. 28, 1964

3,119,694
DISPOSABLE COFFEE PERCOLATOR UNIT
William J. Gauld, 5094 Georgetown, San Diego, Calif.
Filed Aug. 13, 1962, Ser. No. 216,376
5 Claims. (Cl. 99—77.1)

The present invention relates generally to coffee making and more particularly to a disposable coffee percolator unit.

The primary object of this invention is to provide a coffee percolator unit in which the granular coffee is completely enclosed and remains therein while the coffee is being made, the entire unit being disposable after use without the need for emptying out or even exposing the grounds.

Another object of this invention is to provide a disposable coffee percolator unit designed to fit into a coffee pot in place of the existing perforated basket in which the coffee is normally held, the unit resting on and being supported by the existing water conducting stem through which hot water rises to permeate the coffee.

A further object of this invention is to provide a disposable coffee percolator unit in which the coffee granules are contained securely against leakage during handling.

Finally, it is an object to provide a disposable coffee percolator unit of the aforementioned character which is simple and convenient to manufacture and use.

With these and other objects definitely in view, this invention consists in the novel construction, combination and arrangement of elements and portions, as will be hereinafter described in the specification, particularly pointed out in the claims, and illustrated in the drawing which forms a material part of this disclosure, and in which:

Figure 1:
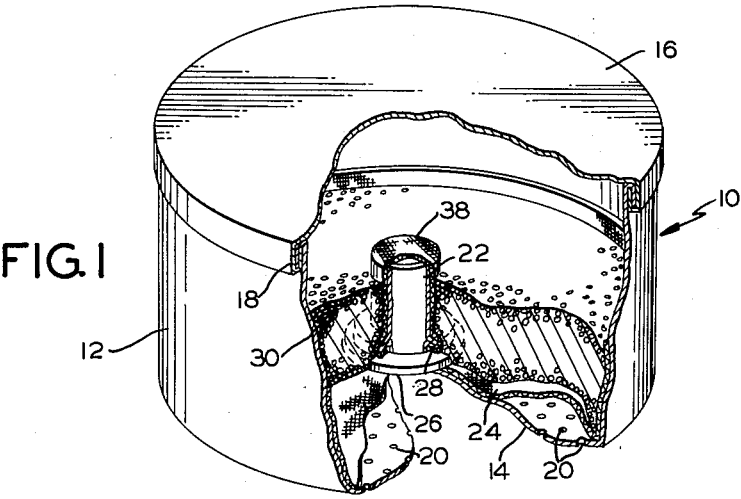
FIGURE 1 is a perspective view, partially cut away, of the percolator unit.

The percolator unit 10 comprises a cylindrical container 12 having a closed lower end panel 14 and an imperforate top cap 16, secured thereto by a folded peripheral seal 18. The lower end panel 14 has a plurality of small perforations 20, in the manner of a screen, to allow passage of fluid coffee. In the center of the lower end panel 14 is an upwardly extending cylindrical sleeve 22, open at the top, which may be formed integrally with said panel. For lightness and economy the container 12 and top cap 16 are preferable pressed from thin sheet material such as aluminum foil, the resultant wrinkles not being a disadvantage.

Inside the container 12 is a filter 24 of woven material, such as cheesecloth, which extends across the lower end panel 14 and partially up the cylindrical side wall of the container, said filter also being extended upwardly around sleeve 22 and closing the end thereof. To hold the filter 24 in place during packaging and handling, a washer-like retaining ring 26 of any suitable material is placed over the portion of the filter surrounding sleeve 22 and pressed downwardly around the sleeve to rest on the lower end panel 14. The sleeve 22 is then internally expanded to provide a radially enlarged flange 28 immediately above retaining ring 26, so clamping the filter 24 securely over said sleeve. A quantity of granular coffee 30 is deposited in container 12 before the top cap 16 is sealed in place, and thereafter the unit 10 need never be opened. The filter 24 prevents loss of fine coffee particles through perforations 20, although the perforations can be very small to prevent this. Direct loss of coffee through sleeve 22 is also prevented by filter 24, which is held securely about the sleeve.

Figure 2:
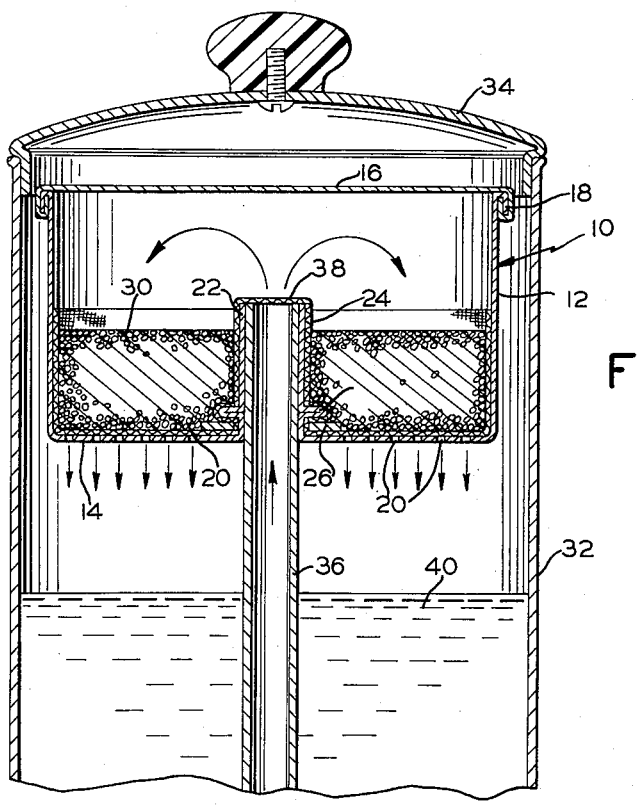
FIGURE 2 is a vertical sectional view of the unit installed in a coffee pot.

In FIGURE 2 the upper portion of a conventional coffee pot 32 is illustrated, the pot having the usual lid 34 and an upright hollow stem 36 through which hot water and steam rises, the arrangement being well known and substantially standardized. The percolator unit 10 is fitted over stem 36 with the stem inside sleeve 22, a portion 38 of filter 24 resting on the upper end of said stem and constituting supporting means holding the unit in place and preventing the unit from sliding down the stem. The unit thus completely replaces the usual perforated basket which holds granular coffee and must be filled and emptied each time coffee is made.

When the water, indicated at 40, boils or reaches the proper temperature, water is forced upwardly through the stem 36 in the usual manner. The water passes through the closed end portion 38 of filter 24 and spills over into the coffee 30, as indicated by directional arrows. The coffee is permeated by the water and the resultant fluid coffee drips through perforations 20 back into the pot.

Most conventional coffee percolators have a perforated lid over the coffee containing basket, and the water rises above this lid to fall back through the coffee. With the percolator unit 10, the water is contained entirely within the unit, since lid 16 is imperforate, and spillage or leakage from under lid 34 is avoided. Due to the upward pressure through stem 36 and the retention within container 12, the water is forced through the coffee and through perforations 20, which accelerates percolation.

When the usefulness of the coffee 20 is exhausted, the percolator unit 10 can be removed and discarded in its entirety. There is no necessity to dispose of coffee grounds and clean the container, as is usually the case. The quantity of coffee can easily be predetermined for various sizes of coffee pots and, being premeasured, ensures consistency of strength in the resultant coffee. The simple construction of the percolator unit is very economical to manufacture and adds little to the cost of coffee when the convenience of the unit is considered. In packaging the units would preferably be individually sealed in plastic bags to preserve flavor, but any other suitable method of packing could be used.

It is understood that minor variation from the form of the invention disclosed herein may be made without departure from the spirit and scope of the invention, and that the specification and drawing are to be considered as merely illustrative rather than limiting.

I claim:
1. A disposable coffee percolator unit, comprising:
   a generally cylindrical container having a perforated lower end panel;
   an imperforate top cap fixed to and closing said container;
   said lower end panel having an upwardly extending sleeve to receive the water conducting stem of a coffee pot;
   a filter in said container covering said lower end panel and having a portion extending over the upper end of said sleeve;
   retaining means holding said filter closely about the base of said sleeve adjacent said lower end panel;
   and a quantity of granular coffee within said container.
2. A disposable coffee percolator unit, comprising:
   a generally cylindrical container having a perforated lower end panel;
   an imperforate top cap fixed to and closing said container;
   said lower end panel having an upwardly extending sleeve to receive the water conducting stem of a coffee pot;
   a filter in said container covering said lower end panel and having a portion extending over the upper end of said sleeve;

a retaining ring surrounding said sleeve and said filter at the base of the sleeve adjacent said lower end panel;

said sleeve having a radially extending flange above said retaining ring to secure the retaining ring and filter in place;

and a quantity of granular coffee within said container.

3. A percolator unit according to claim 2, wherein said container and sleeve are integrally formed from thin metallic foil material;

said top cap being formed from thin metallic foil material and being peripherally sealed to said container.

4. The combination of a coffee pot having an upright hollow stem through which hot water and steam rises;

a disposable coffee percolator unit containing coffee and having means for securing said unit to the top of said stem so as to receive said water and steam, and having openings to permit escape of said water;

said unit including a filter having a portion covering the upper end of said stem and supporting said unit and preventing said unit from sliding down said stem.

5. The combination of a coffee pot having an upright hollow stem through which water and steam rises;

a disposable coffee percolator unit containing coffee and including a container having a base with openings therein to permit escape of said water and;

a filter covering said openings;

a centrally disposed sleeve integral with said container and disposed on the upper end portion of said stem;

said filter covering the top of said sleeve and preventing said container from sliding down said stem; and means securing said filter to said container including means clamping said filter onto said sleeve.

References Cited in the file of this patent

UNITED STATES PATENTS

| | | |
|---|---|---|
| 228,632 | Hathaway | June 8, 1880 |
| 860,272 | Warner | July 16, 1907 |
| 2,224,409 | Schleyer | Dec. 10, 1940 |
| 2,244,520 | Ferrante | June 3, 1941 |
| 2,859,684 | Polizzi | Nov. 11, 1958 |
| 2,948,212 | Sisselman | Aug. 9, 1960 |